Nov. 22, 1955 W. KROPFF 2,724,525
PRESSURE COOKERS
Filed Dec. 17, 1952

Inventor:
Wilhelm Kropff,
by [signature]
Attorney

United States Patent Office 2,724,525
Patented Nov. 22, 1955

2,724,525
PRESSURE COOKERS

Wilhelm Kropff, Olsberg, North Rhine Westphalia, Germany, assignor to Metall-Werk Meschede, G. m. b. H., Meschede, Germany, a firm Application December 17, 1952, Serial No. 326,574

Claims priority, application Germany December 21, 1951

2 Claims. (Cl. 220—40)

The present invention relates to improvements in pressure cookers in which a cooking vessel has a lid or cover connected thereto by a bayonet type or the like fastening means which can be released by turning the lid relatively to the cooking vessel.

Such pressure cookers are usually provided with a safety valve disposed on the cover or lid to avoid building up of undue pressure within the cooker. In prior art pressure cookers it has been necessary to allow the steam pressure within the cooking vessel to subside to normal prior to the displacement and removal of the cover.

The pressure cookers at present in use, in which the lid or cover is connected by a bayonet-type or the like joint with the cooking vessel, comprise a packing disposed therebetween, and the lid or cover is provided with a safety valve or a fusible plug to prevent pressure from being built up within the cooker.

Danger may, however, still arise, in that the person using the pressure cooker may seek to detach the cover or lid whilst there is still pressure within the cooker. Considering, for instance, a cooker having a safety valve operative against the action of gravity, or against spring action, on the lid or cover thereof, which valve is interlocked with a latch precluding opening of the cooker as long as the safety valve is in closed position. Such a cooker can freely be opened when the safety valve is in open position, yet the fact that the safety valve is in the open position is not sufficient assurance that there is no pressure within the cooker. A safety valve may be open yet inoperative, i. e. not permitting the escape of steam under pressure which occurs, for instance, when the venting duct of the valve is clogged by particles of food. It is one of the objects of this invention to provide safety means for pressure cookers eliminating the hazard of opening the cooker while under pressure to the extent that such hazard is still present in spite of a safety valve, or an interlock associated with a safety valve.

According to the present invention, a cock is provided which simultaneously acts as a locking means or interlock between the cover or lid and the cooking vessel to prevent the removal of the cover or lid from the vessel until the pressure therein has subsided.

The invention is further described with reference to the accompanying drawings, in which—

Figure 1:
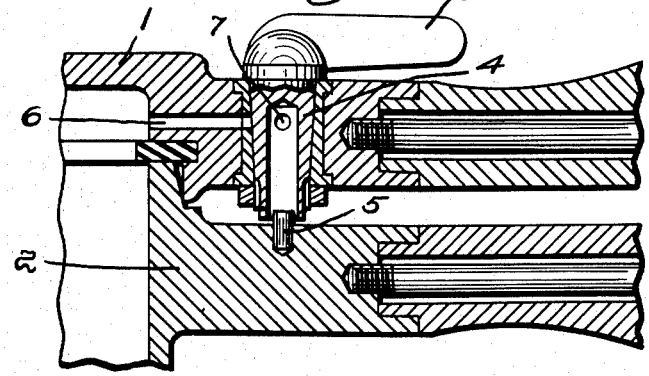
Fig. 1 is a part sectional elevation through a cooking vessel and its cover.
Figure 2:
Fig. 2 is a plan view corresponding to Fig. 1 but with the cover removed.
Figure 3:
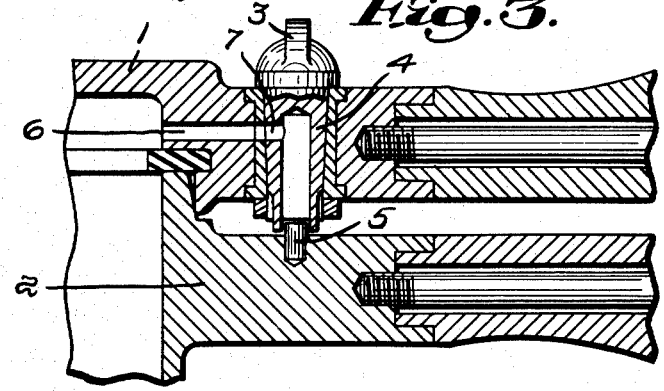
Fig. 3 is a view corresponding to Fig. 1, in which the locking means is released.
Figure 4:
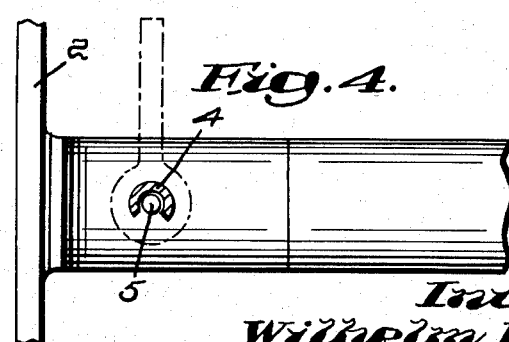
Fig. 4 is a view similar to Fig. 2 with the locking means released.

A combined cock and locking element is disposed on the outer rim of the cover 1, preferably within the boss forming or carrying the handle, which cock 3 has an extension 4 to receive a locking pin 5 which is engaged when the cock 3 is turned clockwise. Upon turning cock 3 in clockwise direction, steam outlet opening 6 passing radially through the rim of lid or cover 1 is closed, lateral bore 7 in cock 3 being turned out of its coaxial or registering position with outlet opening 6. Thus the interior of the cooking vessel is sealed off the outer atmosphere. Turning of cock 3 in clockwise direction causes, in addition to sealing of the cooking vessel, locking of the lid or cover thereof by engagement of pin 5 extending parallel to the longitudinal axis of cock 3 with the extension or abutment surface 4 on cock 3, precluding relative rotation of the lid or cover and the cooking vessel.

When the cooking operation is completed, the cover can be rotated relative to the body of the cooking vessel only if the cock 3 is turned counter-clockwise, whereby the latching engagement with the locking pin 5 is released. Until this operation has been effected, no release and removal of the lid or cover is possible. When the cross bore 7 of the cock 3 has been brought into such a position relative to the steam outlet opening 6 in the cover that the excess of pressure in the cooking vessel is released, the cover is free to be removed from the vessel.

By the above arrangement an interlock for pressure cookers is provided which avoids premature opening of the lid or cover, and thus removes a source of danger.

It is claimed:

1. A pressure cooker comprising a cooking vessel, a cover for closing said vessel, cooperating bayonet-type locking means on said vessel and on said cover operative upon relative rotation of said vessel and said cover to lock said cover to said vessel and to unlock said cover from said vessel, a cock for venting the interior of said vessel arranged in and supported by the outer rim of said cover, and cooperating latching means for precluding unlocking of said bayonet-type locking means and removal of said cover from said vessel unless said cock is in the open position thereof, said latching means comprising a pin attached to said vessel and adapted to engage a cavity in said cock, and means permitting unlatching of said latching means including a slot in said cock enabling removal of said pin from said cavity in said cock by relative rotation of said vessel and said cover upon movement of said cock to the open position thereof.

2. A pressure cooker comprising a cooking vessel, a cover for closing said vessel, cooperating bayonet-type locking means on said vessel and on said cover operative upon relative rotation of said vessel and said cover to lock said cover to said vessel and to unlock said cover from said vessel, a cock for venting the interior of said vessel arranged in and supported by the outer rim of said cover, said cock comprising communicating axial and radial venting passages, said cock further comprising a radial slot situated immediately adjacent the intake end of said axial venting passage thereof, said slot being arranged in said cock in such a way as to extend substantially radially with respect to said vessel and said cover when said cover is in the closed position thereof and to extend substantially in the direction of the tangent to said vessel and said cover at the point thereof where said cock is located when said cock is in the closed position thereof, and a latching pin secured to said vessel arranged in coaxial relation with respect to and projecting into said axial venting passage in said cock, said latching pin being adapted to slide through said slot in said cock upon rotation of said cock to the open position thereof and unlocking of said bayonet-type locking means.

References Cited in the file of this patent

UNITED STATES PATENTS

| | | |
|---|---|---|
| 1,821,726 | Saporta | Sept. 1, 1931 |
| 2,614,721 | Wyman | Oct. 21, 1952 |
| 2,619,254 | Troy | Nov. 25, 1952 |

FOREIGN PATENTS

| | | |
|---|---|---|
| 302,787 | Great Britain | Dec. 27, 1928 |
| 874,691 | France | Mar. 18, 1942 |